May 5, 1970      R. N. LARSEN      3,510,691
PULSE-STRETCHING CIRCUIT
Filed Jan. 13, 1967
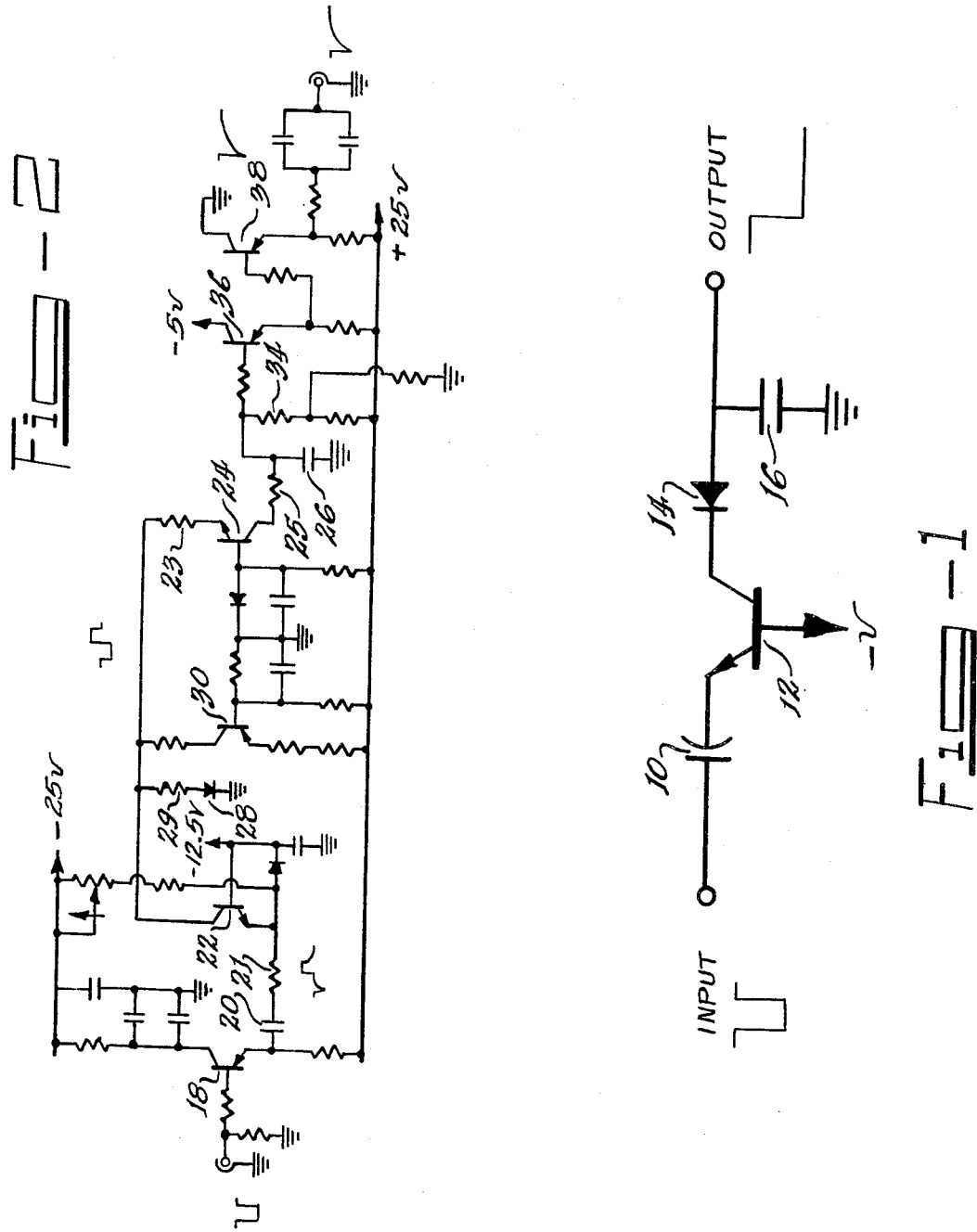
Inventor
Robert N. Larsen
By:
Attorney

United States Patent Office 3,510,691
Patented May 5, 1970

3,510,691
PULSE-STRETCHING CIRCUIT
Robert N. Larsen, Houghton, Mich., assignor to the United States of America as represented by the United States Atomic Energy Commission
Filed Jan. 13, 1967, Ser. No. 609,731
Int. Cl. H03k 5/04
U.S. Cl. 307—267         4 Claims

ABSTRACT OF THE DISCLOSURE

The present voltage pulse-stretching circuit has a capacitive differentiator to convert an applied voltage pulse to a current pulse. A diode switching circuit applies the current pulse to a storage capacitor to provide thereacross a voltage pulse having a duration determined by the discharge rate of the storage capacitor and a value which is the integral of the current pulse.

---

The invention described herein was made in the course of, or under, a contract with the United States Atomic Energy Commission.

BACKGROUND OF THE INVENTION

Field of the invention

The present invention relates to voltage pulse-stretching circuits.

Description of the prior art

Pulse-stretching circuits are commonly used throughout the electrical art. For example, in pulse shape discrimination systems used in nuclear counting to measure the relative specific ionization in a proportional counter by computing the ratio of the charge collected in the first 20 to 50 nanoseconds to the total charge, the computation is performed with an analog pulse height computer after the fast component has been stretched by a voltage pulse stretcher to conform to the computer input-requirements. The common or conventional voltage pulse stretcher used comprises a resistor and a capacitor series connected across a diode, the common junction of the resistor and capacitor being electrically grounded (see Electronics, Elmore and Sands, McGraw-Hill, 1949, page 196). The input to the pulse stretcher is applied across the resistor and the output taken across the capacitor. The most serious limitation of this diode-capacitor stretcher is the nonlinear attenuation characteristics of the diode. For input signals less than a few hundred millivolts, the dynamic resistance of the diode is high and therefore results in attenuation of the signal. Thus, the output voltage of the pulse stretcher is not a linear function of the input voltage. This nonlinearity of the conventional pulse stretcher can be reduced by using a feedback stretcher. However, the bandwidth of the pulse stretcher is then limited by the feedback amplifier of the feedback stretcher. Also, when a conventional pulse stretcher is operated in the nanosecond range, the capacity of the diode permits partial feedthrough of the applied input signal. This feedthrough permits the trailing edge of the input signal to remove some of the stored charge from the output capacitor of the pulse stretcher and causes a "notch" in the output pulse.

SUMMARY OF THE INVENTION

In general, the voltage pulse-stretching circuit of the present invention comprises means for generating a current pulse proportional to the derivative of an applied input voltage pulse. Means are provided for applying this current pulse to current pulse-integrating means, with the output of the pulse-stretching circuit being taken across the pulse-integrating means.

It is one object of the present invention to provide an improved voltage pulse stretcher.

It is another object of the present invention to provide a voltage pulse stretcher whose output is a linear function of the input signal.

It is another object of the present invention to provide a voltage pulse stretcher having minimum feedthrough of the applied input signal.

Further objects of the present invention will become more apparent as the detailed description proceeds.

BRIEF DESCRIPTION OF THE DRAWING

FIG. 1 is an electrical schematic drawing of an embodiment according to the present invention.

FIG. 2 is a detailed electrical schematic drawing of the preferred embodiment according to the present invention.

DESCRIPTION OF THE PREFERRED EMBODIMENT

In FIG. 1, a capacitor 10 is connected to the emitter of a transistor 12. The collector of the transistor 12 is connected through a diode 14 to one side of a capacitor 16. The other side of the capacitor 16 is electrically grounded.

In operation, the voltage pulse to be stretched is applied to the capacitor 10. The capacitor 10 differentiates the input voltage pulse and generates a differentiated current output pulse therefrom. This current pulse proportional to the voltage input pulse amplitude passes through the transistor 12 and diode 14 to the storage capacitor 16. The resultant charge on the capacitor 16 is a linear function of the input voltage even at low input voltage levels (tens of millivolts).

Since the voltage on the storage capacitor 16 is the integral of the current signal output of capacitor 10, the current signal from capacitor 10 must represent the derivative of the input voltage. The differentiation is accomplished for the present invention by choosing the value of the capacitor 10 such that the time constant formed by capacitor 10 and the input resistance of the transistor 12 is small compared to the width of the shortest input voltage pulse to be stretched.

The emitter of the transistor 12 has a low impedance, so the emitter current $I_E$ is equal to $$I_E = C_{10} \frac{d}{dt} V_{in}$$

where $C_{10}$=the capacitance of the capacitor 10 and $V_{in}$=the amplitude of the voltage pulse to be stretched. This current $I_E$ (assuming a unity $\alpha$ of the transistor 12) passes through the quiescently nonconducting diode 14 to capacitor 16. The resulting voltage on capacitor 16 is $$V_{out} = \frac{1}{C_{16}} \int_0^t I_E dt = \frac{C_{10}}{C_{16}} V_{in}$$

where $C_{16}$=the capacitance of capacitor 16, $I_E$=the emitter current of transistor 12, $C_{10}$=the capacitance of capacitor 10 and $V_{in}$=the amplitude of the applied voltage pulse to be stretched. At the time $t$, the trailing edge of the input voltage pulse generates a current of opposite polarity which is applied to the diode 14, causing the diode 14 to switch off, and the peak voltage $V_{out}$ remains on the storage capacitor 16. It can be seen from the equation depicting $V_{out}$ that the circuit of FIG. 1 can have gain depending upon the ratio of $C_{10}/C_{16}$.

Turning to FIG. 2, a detailed electrical schematic for the practice of the present invention is illustrated. The input voltage pulse to be stretched is applied to the base of an emitter follower transistor 18. The emitter of the emitter follower 18 is connected to a differentiating capacitor 20. Capacitor 20 converts the applied input voltage pulse into a typical differentiated current pulse having positive and negative portions thereto. The other side of capacitor 20 is connected via resistor 21 to the emitter of a transistor 22 whose collector is connected via resistor 23 to the emitter of a transistor 24. The collector of transistor 24 is connected via resistor 25 to an integrating capacitor 26. A diode 28 and resistor 29 are interconnected between electrical ground and the collector of transistor 22, as shown.

In the absence of an input voltage pulse, transistor 24 is quiescently off by virtue of a positive potential existing on the emitter thereof. This positive potential is obtained by maintaining the diode 28 quiescently on via transistors 22 and 30. With the advent of an input voltage pulse, the capacitor 20 converts the input voltage pulse to a differentiated current pulse. This differentiated current pulse is applied via transistor 22 to the emitter of transistor 24. The leading negative portion of the differentiated current pulse from capacitor 20 passes through transistor 22 to bias diode 28 off and transistor 24 on to permit the passage thereof through transistor 24 to the storage capacitor 26. As the negative portion of differentiated current pulse returns to zero, transistor 24 turns off, leaving a charge on capacitor 26. The trailing positive portion of the differentiated current pulse is applied to the common terminal of resistors 23 and 29 where it is shunted to ground through diode 28. The charge which was deposited on the storage capacitor 26 then leaks off through resistor 34 with a time constant of $R_{34}C_{26}$, where $C_{26}$ is the value of capacitor 26 and $R_{34}$ is the resistance of resistor 34. The value of resistor 34 is selected to give the desired decay time of the stretched voltage pulse, The input impedance of emitter followers 36 and 38 is high compared to resistance 34 and therefore isolates capacitor 26 from the output load connected to the pulse-stretching circuit. Further, the voltage swing at the emitter of transistor 24 is small, so that the effect of capacitive feedthrough from emitter to collector of transistor 24 during the trailing edge of the differentiated current waveform is negligible. In the circuit of FIG. 2, there is a slight threshold in the circuit due to the small quiescent current flowing through diode 28 as well as the charge which is lost in charging the stray capacitance across diode 28. This threshold effect is made quite small by choosing the value of capacitor 20 large enough so that the full-scale pulse current is large compared to the quiescent curernt flowing through diode 28.

For the embodiment of FIG. 2 the following values were found to be acceptable.

Transistor 18=Type 2N2098 transistor.
Transistors 22 and 24=Type 2N2219 transistors.
Transistors 30, 36 and 38=Type 2N2905 transistors.
Capacitor 20= 330 picofarads.
Resistor 23=22 ohms.
Resistor 29=10 ohms.
Resistor 40=20 ohms.
Diode 28=Type SG5000 diode.
Resistor 42=22 ohms.

With these values a voltage pulse-stretching circuit is obtained which is superior to the conventional voltage pulse stretcher, providing an output which is a linear function of the input signal and has minimum feedthrough of the applied input signal.

It is to be understood that the embodiment of FIG. 2 has been described heretofore using a mode of operation designed for accepting negative polarity input voltage pulses. However, the circuit of FIG. 2 is not limited to acceptance and stretching of negative polarity input voltage pulses but is equally applicable to input voltage pulses having positive polarity. In the event that positive polarity input voltages are applied to the embodiment of FIG. 2, the biasing of the various components thereof should be reversed in order that the circuit may function in a proper manner.

Persons skilled in the art will, of course, readily adapt the general teachings of the present invention to embodiments far different than the embodiments illustrated. Accordingly, the scope of the protection afforded the invention should not be limited to the particular embodiments illustrated in the drawings and described above, but should be determined only in accordance with the appended claims.

The embodiments of the invention in which an exclusive property or privilege is claimed are defined as follows:

1. A voltage pulse-stretching circuit comprising means for generating a current pulse proportional to the derivative of said voltage pulse; means for selecting a predetermined polarity of said differential pulse; current pulse-integrating means; and means for applying said polarity-selected differentiated current pulse to said integrating means; said current-pulse-generating means including a first capacitor; bias-voltage means; a first transistor including an emitter, a collector and a base; means for connecting the emitter of said first transistor to said first capacitor; means for connecting the collector of said first transistor to said current-pulse-polarity-selecting means; and means for connecting said base of said first transistor to said bias-voltage means; said first capacitor and the emitter resistance of said first transistor having values to produce a time constant therefrom less than the time duration of said voltage pulse; and means for applying said voltage pulse to said first capacitor.

2. The device according to claim 1 wherein said current pulse-selecting, applying and integrating means comprise a diode, a capacitor series connected with said diode across the output of said current pulse-generating means, and an output taken across said capacitor.

3. The device according to claim 1 wherein said pulse-selecting, applying and integrating means comprise a second capacitor; a second transistor including a collector, a base and an emitter; means for connecting the collector of said second transistor to said second capacitor; means for connecting the collector of said first transistor to the emitter of said second transistor; means for connecting said base of said second transistor to said bias-voltage source to bias said second transistor into conduction responsive only to said polarity-selected differentiated current pulse; and output means taken across said second capacitor.

4. A voltage pulse-stretching circuit comprising a first capacitor; means for applying said voltage pulse to said capacitor; a first transistor having an emitter, a collector and a base; means for connecting said first capacitor to the emitter of said first transistor; a second transistor having an emitter, a collector and a base; means for interconnecting the collector of said first transistor and the emitter of said second transistor; a diode; means connecting said diode between electrical ground and the emitter of said second transistor; a third transistor having an emitter, a collector and a base; means connecting the collector of said third transistor and said diode; bias-voltage means; means connecting the bases of said transistors to said bias-voltage means; a second capacitor; means for connecting said second capacitor to the collector of said second transistor; and output means taken across said second capacitor.

References Cited

UNITED STATES PATENTS

| | | | |
|---|---|---|---|
| 2,956,227 | 10/1960 | Pierson | 324—78 |
| 3,193,701 | 7/1965 | Lawhon | 307—267 X |
| 3,207,923 | 9/1965 | Prager | 307—225 |
| 2,759,052 | 8/1956 | MacDonald et al. | 307—229 |
| 2,956,118 | 10/1960 | Goodrich | 307—235 X |
| 3,204,124 | 8/1965 | Durio | 307—267 X |
| 3,364,365 | 1/1968 | Eisenhauer | 307—265 X |

DONALD D. FORRER, Primary Examiner

S. D. MILLER, Assistant Examiner

U.S. Cl X.R.

307—229